(12) United States Patent
Ranki et al.

(10) Patent No.: US 9,939,516 B2
(45) Date of Patent: Apr. 10, 2018

(54) DETERMINING LOCATION AND ORIENTATION OF DIRECTIONAL TRANSCEIVERS

(75) Inventors: Ville Ranki, Jorvas (FI); Antti Kainulainen, Nummela (FI); Kimmo Kalliola, Espoo (FI); Fabio Belloni, Espoo (FI)

(73) Assignee: Provenance Asset Group LLC, Essex, CT (US)

( * ) Notice: Subject to any disclaimer, the term of this patent is extended or adjusted under 35 U.S.C. 154(b) by 599 days.

(21) Appl. No.: 14/401,645

(22) PCT Filed: May 30, 2012

(86) PCT No.: PCT/IB2012/052714
§ 371 (c)(1),
(2), (4) Date: Nov. 17, 2014

(87) PCT Pub. No.: WO2013/179090
PCT Pub. Date: Dec. 5, 2013

(65) Prior Publication Data
US 2015/0160329 A1  Jun. 11, 2015

(51) Int. Cl.
*G01S 3/02* (2006.01)
*G01S 5/04* (2006.01)
*G01S 5/02* (2010.01)

(52) U.S. Cl.
CPC .............. *G01S 5/04* (2013.01); *G01S 5/0284* (2013.01); *G01S 5/0252* (2013.01); *G01S 5/0263* (2013.01)

(58) Field of Classification Search
CPC .......... G01S 5/04; G01S 5/284; G01S 5/0009; G01S 5/0252; G01S 5/0263
(Continued)

(56) References Cited

U.S. PATENT DOCUMENTS 6,490,456 B1 * 12/2002 Bogdan ................. H04W 64/00
                                                                    342/450
6,539,229 B1 *  3/2003 Ali ........................ G01S 5/0036
                                                                    342/450
(Continued)

FOREIGN PATENT DOCUMENTS

FR          2948462 A1    1/2011
WO       2007067592       6/2007
(Continued)

OTHER PUBLICATIONS

International Search Report received for corresponding Patent Cooperation Treaty Application No. PCT/IB2012/052714, dated Feb. 20, 2013, 5 pages.
(Continued)

*Primary Examiner* — Chuong P Nguyen
(74) *Attorney, Agent, or Firm* — Dinsmore & Shohl LLP (57) ABSTRACT

A method comprises using a first directional transceiver (14A) to determine a first angle ($\alpha_1$) between a first vector ($V_1$) from the first directional transceiver to a second directional transceiver (14B) and a second vector ($V_2$) from the first directional transceiver to a third directional transceiver (14C), using the second directional transceiver to determine a second angle ($\alpha_2$) between a third vector ($V_3$) from the second directional transceiver to the first directional transceiver and a fourth vector ($V_4$) from the second directional transceiver to the third directional transceiver, calculating a location, relative to a local coordinate system, of the third directional transceiver using the first and second angles and locations in the local coordinate system of the first and second directional transceivers, the local coordinate system being defined relative to the locations of the first, second, and third directional transceivers, and calculating an orientation relative to the local coordinate system of the first directional transceiver using directions of the first and
(Continued)

second vectors relative to the first directional transceiver and the locations in the local coordinate system of the first, second and third directional transceivers.

21 Claims, 5 Drawing Sheets

(58) Field of Classification Search
USPC .................................................. 342/450, 451
See application file for complete search history.

(56) References Cited

U.S. PATENT DOCUMENTS

| | | | |
|---|---|---|---|
| 6,865,395 B2 * | 3/2005 | Riley | G01S 5/0252 342/464 |
| 7,053,829 B2 | 5/2006 | Krause et al. | |
| 7,415,262 B2 | 8/2008 | Liu et al. | |
| 7,729,707 B2 * | 6/2010 | Aljadeff | H04B 7/2681 342/450 |
| 7,738,904 B1 | 6/2010 | Chien et al. | |
| 8,131,230 B2 | 3/2012 | Xhafa et al. | |
| 8,462,745 B2 * | 6/2013 | Alizadeh-Shabdiz | G01S 5/0263 370/338 |
| 9,341,702 B2 * | 5/2016 | Reimann | G01S 3/143 |
| 9,658,317 B2 * | 5/2017 | Reimann | G01S 3/143 |
| 2004/0203539 A1 | 10/2004 | Benes et al. | |
| 2006/0170591 A1 | 8/2006 | Houri | |
| 2009/0005975 A1 | 1/2009 | Forstall | |
| 2009/0043504 A1 | 2/2009 | Bandyopadhyay | |
| 2010/0323723 A1 | 12/2010 | Gerstenberger et al. | |
| 2011/0159888 A1 * | 6/2011 | Braiman | G01S 5/0252 455/456.1 |
| 2011/0172916 A1 | 7/2011 | Pakzad et al. | |
| 2012/0115512 A1 | 5/2012 | Grainger et al. | |
| 2013/0029685 A1 | 1/2013 | Moshfeghi | |
| 2014/0171107 A1 * | 6/2014 | Kao | G01C 21/206 455/456.1 |
| 2015/0006073 A1 * | 1/2015 | Moshfeghi | G01S 5/14 701/408 |

FOREIGN PATENT DOCUMENTS

| | | |
|---|---|---|
| WO | 2009056150 | 5/2009 |
| WO | 2011066473 | 6/2011 |
| WO | 2012042315 | 4/2012 |

OTHER PUBLICATIONS

Extended European Search Report received for corresponding European Patent Application No. 12877697.8, dated Jan. 4, 2016, 10 pages.
Niculescu et al., "Ad hoc positioning system (APS) using AOA", Twenty-Second Annual Joint Conference of the IEEE Computer and Communications. IEEE Societies, vol. 3, Mar. 30-Apr. 3, 2003, 10 Pages.
Shah et al., "Implementation of a directional beacon-based position location algorithm in a signal processing framework", IEEE Transactions on Wireless Communications, vol. 9, No. 3, Mar. 2010, pp. 1044-1053.
Niculescu et al., "Localized positioning in ad hoc networks", Proceedings of the First IEEE International Workshop on Sensor Network Protocols and Applications, May 11, 2003, pp. 42-50.
Office Action received for corresponding European Patent Application No. 12877697.8, dated Dec. 21, 2016, 7 pages.

* cited by examiner

DETERMINING LOCATION AND ORIENTATION OF DIRECTIONAL TRANSCEIVERS

RELATED APPLICATION

This application was originally filed as PCT Application No. PCT/IB2012/052714 filed May 30, 2012.

FIELD

The invention relates to using directional transceivers.

BACKGROUND

There are a number of known techniques for determining the position of an electronic device using radio frequency signals. Some popular techniques make use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from different disadvantages.

SUMMARY

In a first aspect, this specification describes a method comprising using a first directional transceiver to determine a first angle between a first vector from the first directional transceiver to a second directional transceiver and a second vector from the first directional transceiver to a third directional transceiver, using the second directional transceiver to determine a second angle between a third vector from the second directional transceiver to the first directional transceiver and a fourth vector from the second directional transceiver to the third directional transceiver, calculating a location, relative to a local coordinate system, of the third directional transceiver using the first and second angles and locations in the local coordinate system of the first and second directional transceivers, the local coordinate system being defined relative to the locations of the first, second and third directional transceivers. The method may also comprise calculating an orientation relative to the local coordinate system of the first directional transceiver using directions of the first and second vectors relative to the first directional transceiver and the locations in the local coordinate system of the first, second and third directional transceivers.

The method may comprise calculating an orientation relative to the local coordinate system of the second directional transceiver using directions of the third and fourth vectors relative to the second directional transceiver and the locations in the local coordinate system of the first, second and third directional transceivers.

The method may comprise calculating at least one of the location of the third directional transceiver relative to a reference coordinate system, the orientation of the first directional transceiver relative to the reference coordinate system, and the orientation of the second directional transceiver relative to the reference coordinate system, using the calculated orientations of the first and second directional transceivers, the calculated location of the third directional transceiver and pre-stored information identifying parameters, in the reference coordinate system, relating to the first and second directional transceivers.

The method may comprise using the third directional transceiver to determine a third angle between a fifth vector from the third directional transceiver to the first directional transceiver and a sixth vector from the third directional transceiver to the second directional transceiver. The method may further comprise calculating an orientation relative to the local coordinate system of the third directional transceiver using directions of the fifth and sixth vectors relative to the third directional transceiver and the locations relative to the local coordinate system of the first, second and third directional transceivers.

The method may comprise using one of the first, second and third directional transceivers to determine a direction of a seventh vector from the one of the first, second and third directional transceivers to a fourth directional transceiver, using another one of the first, second and third directional transceivers to determine a direction of an eighth vector from the another one of the first, second and third directional transceivers to the fourth directional transceiver, and calculating a location of the fourth directional transceiver using the locations of the one and the another one of the first, second and third directional transceivers and the directions of the seventh and eighth vectors. The method may further comprise using the fourth transceiver to determine the direction of a ninth vector from the fourth directional transceiver to the one of the first, second and third directional transceivers, using the fourth transceiver to determine the direction of a tenth vector from the fourth directional transceiver to the another one of the first, second and third directional transceivers, and calculating an orientation of the fourth directional transceiver using the locations of the one and the another one of the first, second and third directional transceivers, the location of the fourth directional transceiver, and the directions of the ninth and tenth vectors.

The method may comprise summing the first, second and third angles, if the sum of the first, second and third angles is within an acceptable error from one hundred and eighty degrees, calculating the location of the third directional transceiver, and if the sum of the first, second and third angles is outside an acceptable error from one hundred and eighty degrees, discontinuing the method. The method may further comprise, subsequent to discontinuing the method, restarting the method but substituting at least one of the first, second and third directional transceivers for another directional transceiver.

At least one of the first, second and third directional transceivers may form part of a positioning system for determining a location of a device.

According to a second aspect, this specification describes apparatus comprising at least one processor and at least one memory including computer program code, the at least one memory and the computer program code configured to, with the at least one processor, cause the apparatus to use a first directional transceiver to determine a first angle between a first vector from the first directional transceiver to a second directional transceiver and a second vector from the first directional transceiver to a third directional transceiver, to use the second directional transceiver to determine a second angle between a third vector from the second directional transceiver to the first directional transceiver and a fourth vector from the second directional transceiver to the third directional transceiver, to calculate a location, relative to a local coordinate system, of the third directional transceiver using the first and second angles and locations in the local coordinate system of the first and second directional transceivers, the local coordinate system being defined relative to the locations of the first, second and third transceivers, and to calculate an orientation relative to the local coordinate system of the first directional transceiver using directions of the first and second vectors relative to the first directional transceiver and the locations in the local coordinate system of the first, second and third directional transceivers.

The at least one memory and the computer program code may be configured, with the at least one processor, to cause the apparatus to calculate an orientation relative to the local coordinate system of the second directional transceiver using directions of the third and fourth vectors relative to the second directional transceiver and the locations in the local coordinate system of the first, second and third directional transceivers.

The at least one memory and the computer program code may be configured, with the at least one processor, to cause the apparatus to calculate at least one of the location of the third directional transceiver relative to a reference coordinate system, the orientation of the first directional transceiver relative to the reference coordinate system, and the orientation of the second directional transceiver relative to the reference coordinate system, using the calculated orientations of the first and second directional transceivers, the calculated location of the third directional transceiver, and pre-stored information identifying parameters, in the reference coordinate system, relating to the first and second directional transceivers.

The at least one memory and the computer program code may be configured, with the at least one processor, to cause the apparatus to use the third directional transceiver to determine a third angle between a fifth vector from the third directional transceiver to the first directional transceiver and a sixth vector from the third directional transceiver to the second directional transceiver. The at least one memory and the computer program code may be configured, with the at least one processor, to cause the apparatus to calculate an orientation relative to the local coordinate system of the third directional transceiver using directions of the fifth and sixth vectors relative to the third directional transceiver and the locations relative to the local coordinate system of the first, second and third directional transceivers.

The at least one memory and the computer program code may be configured, with the at least one processor, to cause the apparatus to use one of the first, second and third directional transceivers to determine a direction of a seventh vector from the one of the first, second and third directional transceivers to a fourth directional transceiver, to use another one of the first, second and third directional transceivers to determine a direction of an eighth vector from the another one of the first, second and third directional transceivers to the fourth directional transceiver, and to calculate a location of the fourth directional transceiver using the locations of the one and the another one of the first, second and third directional transceivers and the directions of the seventh and eighth vectors. The at least one memory and the computer program code may be configured, with the at least one processor, to cause the apparatus to use the fourth transceiver to determine the direction of a ninth vector from the fourth directional transceiver to the one of the first, second and third directional transceivers, to use the fourth transceiver to determine the direction of a tenth vector from the fourth directional transceiver to the another one of the first, second and third directional transceivers, and to calculate an orientation of the fourth directional transceiver using the locations of the one and the another one of the first, second and third directional transceivers, the location of the fourth directional transceiver, and the directions of the ninth and tenth vectors.

The at least one memory and the computer program code may be configured, with the at least one processor, to cause the apparatus to sum the first, second and third angles, if the sum of the first, second and third angles is within an acceptable error from one hundred and eighty degrees, to calculate the location of the third directional transceiver, and if the sum of the first, second and third angles is outside an acceptable error from one hundred and eighty degrees, to discontinue operations.

The at least one memory and the computer program code may be configured, with the at least one processor, to cause the apparatus, subsequent to discontinuing operations, to restart operations with another directional transceiver substituted in place of at least one of the first, second and third directional transceivers.

In a third aspect, this specification describes computer-readable code which, when executed by computing apparatus, causes the computing apparatus to perform a method according to the first aspect.

In a fourth aspect, this specification describes at least one non-transitory computer readable memory medium having computer readable instructions stored thereon, the computer readable instructions, when executed by at least one processor, causing the at least one processor to cause a method according to the first aspect.

In a fifth aspect, this specification describes apparatus comprising means for using a first directional transceiver to determine a first angle between a first vector from the first directional transceiver to a second directional transceiver and a second vector from the first directional transceiver to a third directional transceiver, means for using the second directional transceiver to determine a second angle between a third vector from the second directional transceiver to the first directional transceiver and a fourth vector from the second directional transceiver to the third directional transceiver, means for calculating a location, relative to a local coordinate system, of the third directional transceiver using the first and second angles and locations in the local coordinate system of the first and second directional transceivers, the local coordinate system being defined relative to the locations of the first, second and third directional transceivers, and means for calculating an orientation relative to the local coordinate system of the first directional transceiver using directions of the first and second vectors relative to the first directional transceiver and the locations in the local coordinate system of the first, second and third directional transceivers.

In a sixth aspect, this specification describes apparatus configured to use a first directional transceiver to determine a first angle between a first vector from the first directional transceiver to a second directional transceiver and a second vector from the first directional transceiver to a third directional transceiver, to use the second directional transceiver to determine a second angle between a third vector from the second directional transceiver to the first directional transceiver and a fourth vector from the second directional transceiver to the third directional transceiver, to calculate a location, relative to a local coordinate system, of the third directional transceiver using the first and second angles and locations in the local coordinate system of the first and second directional transceivers, the local coordinate system being defined relative to the locations of the first, second and third transceivers, and to calculate an orientation relative to the local coordinate system of the first directional transceiver using directions of the first and second vectors relative to the first directional transceiver and the locations in the local coordinate system of the first, second and third directional transceivers.

BRIEF DESCRIPTION OF THE FIGURES

For a more complete understanding of example embodiments, reference is now made to the following description taken in connection with the accompanying drawings in which.

DETAILED DESCRIPTION

In the description and drawings, like reference numerals refer to like elements throughout.

Positioning packets can be used to determine and track the position of a mobile device in any area provided with a suitable infrastructure. The mobile device may be for instance a location tag that is to be used for asset tracking. It may alternatively be a more complex device.

Positioning making use of positioning packets can be used to achieve accurate positioning indoors. Some systems may enable a resolution down to 30 cm. It may be based for instance on low cost Bluetooth Low Energy (BT LE) technology, which is a feature of the Bluetooth 4.0 technology being standardized by the Bluetooth Special Interest Group (SIG).

A positioning system making use of periodic BT LE transmissions can be used with smart devices that locate themselves using a BT LE signal emitted by directional transceivers (DT). This may be referred to as "downlink" mode. DTs are also referred to as beacons. DTs are generally comprised of multiple antennas provided in an array. In downlink mode, the DT may transmit a signal sequentially using several antennas and the smart device receives this using a single antenna. The smart device can calculate its direction vector (or bearing) from the DT if it knows the DT antenna switching pattern of the transmitted signal and the DT antenna array calibration pattern.

Alternatively, a reversed mode of operation can be used. In this "asset tracking" or "uplink" mode, BT LE transceivers that are referred to as tags, or location tags, emit a signal that is picked up by one or more DTs. The signal is a data packet that enables a DT to identify the tag. The packet may be referred to as a positioning packet. The positioning packet has a form that allows the DT (or another device) to calculate the direction vector (bearing) from the DT towards the tag using a reception of the signal by multiple antennas of the DT. This process is also referred to as "tag update". An HDP (high definition positioning) infrastructure behind the DTs may calculate the position of the tag.

The position of the device may be calculated using the known location and orientation of one DT and a bearing to the tag from the DT, optionally with constraint information. Position may also be calculated based on the bearings determined by two, three or more DTs using triangulation.

The HDP infrastructure may comprise to this end a positioning server that contains data buffering and position calculation functions. Additionally, the HDP infrastructure may contain various management and application servers.

Location tags supporting "uplink" mode can be particularly small and inexpensive, and they may be attached to any desired moving object. A location tag may comprise for instance a battery, some logic in the form of a microcontroller, and radio parts. It may be configured to transmit periodically a signal in order to enable determination of positions of the tag. The positions may be used, for instance, for tracking an object to which the tag is associated. Typical frequencies of transmissions and thus of enabled location updates are 1, 10 or 50 times per second.

While the positioning of a mobile device by means of positioning packets can be realized in a positioning system using BT LE, it is to be understood that a similar approach can be used with various other systems and transmission technologies, for instance with a positioning system using active radio frequency identification (RFID).

WO2009/056150 describes various positioning systems and methods, which may be similar to those described above.

As described above, in order for the location of the device or tag in a reference coordinate system to be determined, the location and orientation, in the reference coordinate system, of the directional transceiver (DT) with which the tag or device is communicating must be known. The reference coordinate system may be, for example, the global coordinate system, based on north, east and gravity. The location and orientation of the directional transceivers may be determined separately for each transceiver during installation of the transceiver. However, typical positioning systems comprise plural directional transceivers. As such, determination of the location and orientation of each individual directional transceiver during installation can be a laborious and slow process. Alternatively, the directional transceivers can be installed at predefined locations and having a predefined orientation. However, not only does this require a very high degree of accuracy during installation, it also requires that suitable installation sites having appropriate locations and orientations are available, and this is not always possible.

Example embodiments described herein allow the location and orientation of one or more directional transceivers of an in-field positioning system comprising plural directional transceivers to be determined after installation of the directional transceivers. Consequently, the need for all the directional transceivers to be installed at known locations and having known orientations may be avoided. In addition, it may also not be necessary to measure accurately the orientation and location of each directional transceiver during installation. Also, some example embodiments allow post-installation translation and/or rotation of one or more of the directional transceivers in the in-field positioning system to be detected. Previously, this was only detectable by hand or as consequence of the presence of error in the location information returned by the positioning system.

Figure 1:
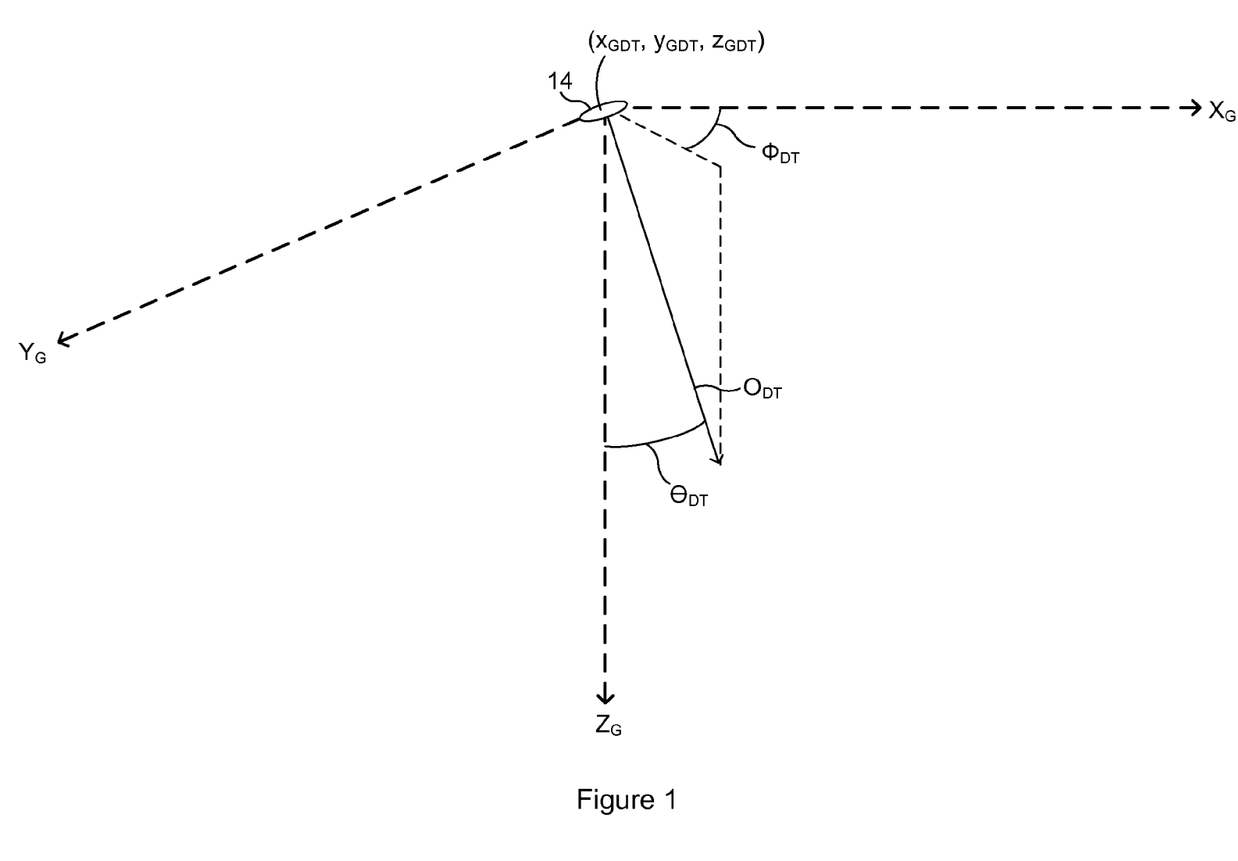
FIG. 1 is a schematic diagram showing the location and orientation of a directional transceiver relative to a reference coordinate system.

FIG. 1 is a schematic illustration of a directional transceiver 14 and shows its location and orientation relative to a reference coordinate system. The reference coordinate system here is denoted by the axes $X_G$, $Y_G$, $Z_G$. In examples in which the reference coordinate system is the global coordinate system, the x-axis $X_G$ extends in the direction of north, the y-axis $Y_G$ extends in the direction of east and the z-axis $Z_G$ extends in the direction of gravity.

In this example, the location of the directional transceiver 14 in the reference coordinate system is given as $x_{GDT}$, $y_{GDT}$, $z_{GDT}$. The orientation of the directional transceiver 14 is shown by the arrow marked $O_{DT}$. This orientation $O_{DT}$ of the directional transceiver 14 may be defined as, for example, the axis of symmetry of a cone (not shown) within which the directional transceiver 14 is operable to emit and receive radio signals. The orientation of the transceiver may be defined by three angles. These angles may be defined as the angle $\theta_{DT}$ between the orientation $O_{DT}$ and the z-axis $Z_G$ (sometimes referred to as the elevation), the angle $\varphi_{DT}$ between the projection of the orientation $O_{DT}$ in the $X_G$-$Y_G$ plane and the x-axis $X_G$ (sometimes referred to as the azimuth), and a third angle (not marked on FIG. 1) which is the rotational orientation of the directional transceiver 14 about the axis of symmetry of the cone (i.e. the arrow marked $O_{DT}$). It will of course be appreciated that the orientation may alternatively be defined using one or more angles which are different to those described above. It should be noted that, although the orientation of the directional transceiver is defined by three angles, the direction estimation obtained using the directional transceiver 14, when calculating positions of, for example, a tag, produces only two angles; it does not produce the rotation around the arrow $O_{DT}$.

Figure 2:
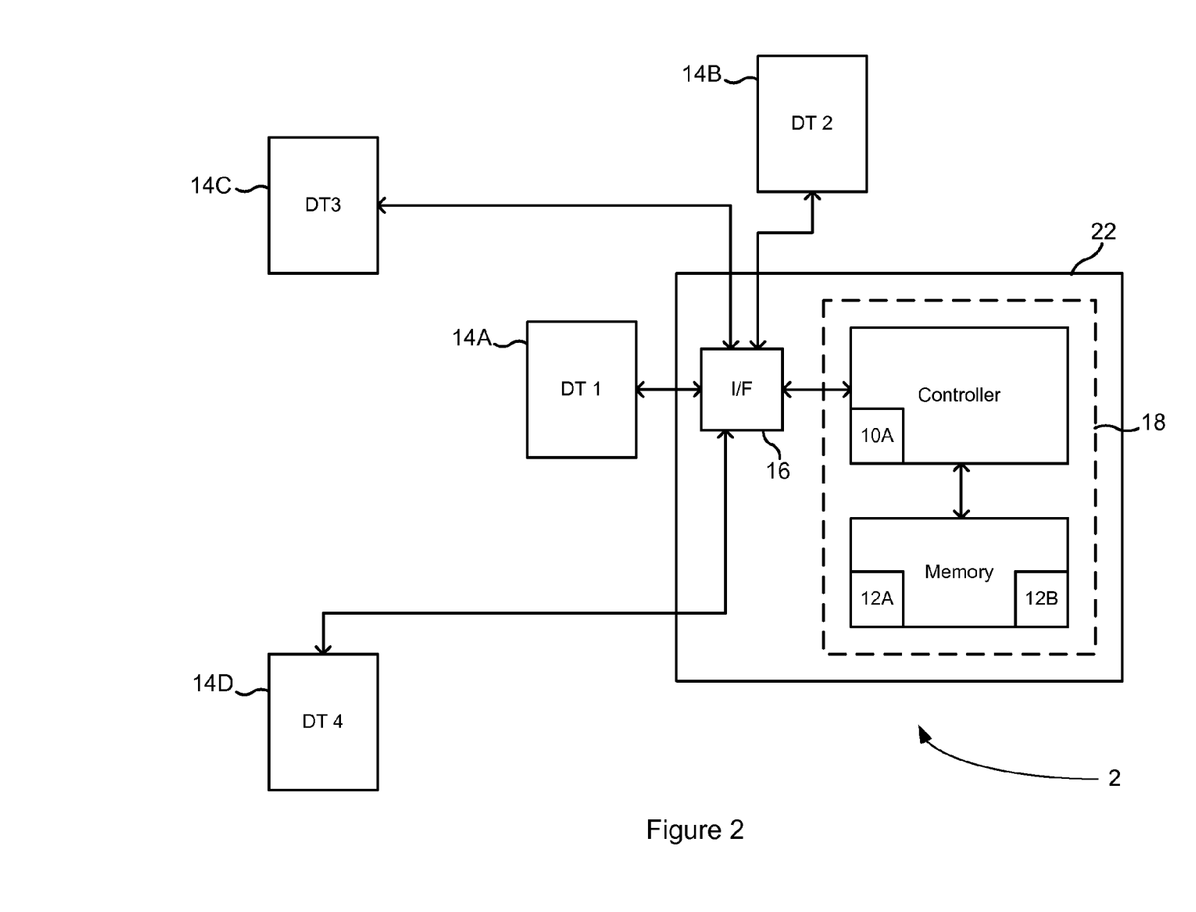
FIG. 2 is a schematic illustration of a system in accordance with example embodiments.

FIG. 2 is an illustrative schematic of a system 2 for enabling the detection of post-installation rotation and/or translation of one or more directional transceivers of an in-field positioning system. The system may also or alternatively enable the post-installation determination of the locations and orientations relative to a reference coordinate system of one or more directional transceivers in a positioning system.

The system 2 comprises plural directional transceivers 14. In this example, the system 2 comprises first to fourth directional transceivers 14A, 14B, 14C, 14D. However, in other examples, the system 2 may comprise fewer or more than four directional transceivers. Each of the plural directional transceivers 14A, 14B, 14C, 14D is in communication with a processing module 22. The processing module 22 is operable to process signals received from the directional transceivers 14A, 14B, 14C, 14D. The processing module 22 comprises an interface 16 which is operable to receive signals from the directional transceivers 14A, 14B, 14C, 14D and to pass these on to processing apparatus 18. The directional transceivers 14 and the interface 16 may communicate over any suitable wired or wireless connection. The processing module 22 is operable also to cause the directional transceivers 14A, 14B, 14C, 14D to transmit positioning packets.

The processing apparatus 18 comprises a controller 10 and at least one memory 12. The controller 10 is operable to receive signals from each of the directional transceivers 14A, 14B, 14C, 14D via the interface 16. The controller 10 is also operable to process these signals under the control of computer readable instructions 12A stored in at least one non-transitory memory 12. More specifically, the controller 10 is operable to receive signals from the directional transceivers 14A, 14B, 14C, 14D and to determine therefrom locations and orientations of the directional transceivers 14A, 14B, 14C, 14D in a local coordinate system. The local coordinate system is defined relative to two or more of the directional transceivers 14A, 14B, 14C, 14D. The processing apparatus 22 may also be operable to determine the orientations and locations of one or more of the directional transceivers 14A, 14B, 14C, 14D in a reference coordinate system.

The controller 10 comprises at least one processor 10A (which may be referred to as processing means) which is configured to execute the computer readable instructions 12A stored in the at least one memory 12. The controller 10 may also comprise one or more application specific integrated circuits (not shown).

The at least one memory 12 may comprise one or more distinct memory media. These one or more media may be of any suitable type, or combination of types, of memory media. Suitable types of memory media include, but are not limited to, ROM, RAM, EEPROM and flash memory. The memory 12 may also have a table 12B stored therein. The table 12B (which may also be referred to as an ephemeris) includes information or parameters regarding the locations and/or orientations of one or more of the directional transceivers 14A, 14B, 14C, 14D in the positioning system. The table 12B may be updated as parameters are calculated by the processing apparatus 18.

The processing module 22 may also comprise a user interface (not shown) for allowing a user to provide instructions to the module 22 and/or for outputting information to a user of the module.

Figure 3:
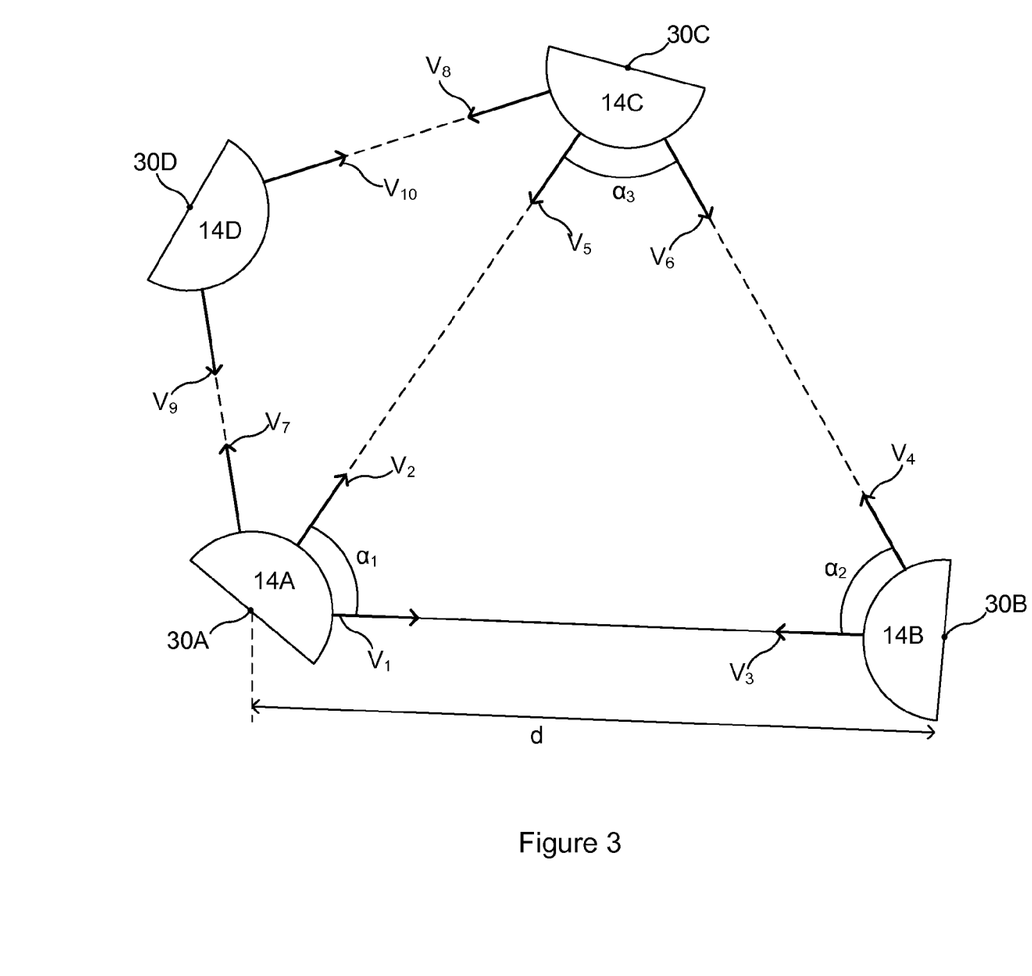
FIG. 3 is a schematized view of an array of directional transceivers which illustrates example embodiments.

FIG. 3 is a schematic illustration of an example arrangement of the plural directional transceivers shown in FIG. 2. FIG. 3 will be used in conjunction with the flow chart of FIGS. 4A and 4B to describe methods and operations according to example embodiments.

Figure 4A:
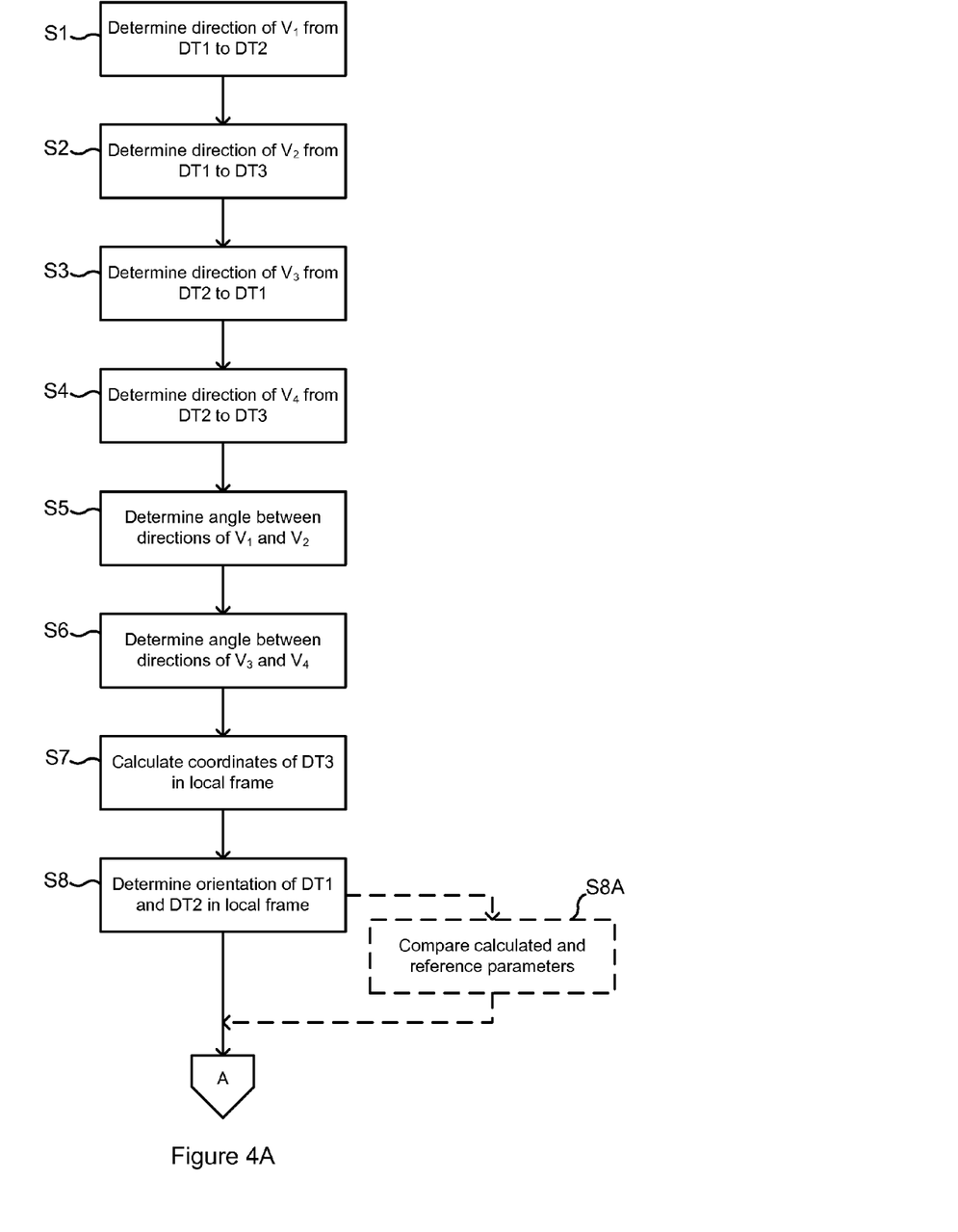
FIGS. 4A and 4B show a flow chart depicting methods according to example embodiments.

In step S1, the controller 10 uses the first directional transceiver 14A to determine a direction of a vector $V_1$. The vector $V_1$ extends in a direction from the first directional transceiver 14A to the second directional transceiver 14B. This may be performed by causing the first directional transceiver 14A to send a positioning packet and by determining the direction of departure of the positioning packet to the second directional transceiver 14B. Alternatively, the step may be performed by causing the second directional transceiver 14B to transmit a positioning packet and by determining the direction of arrival of the packet at the first directional transceiver 14A.

At this stage, the direction of the vector $V_1$ is relative to the first directional transceiver 14B only. The direction may be in the form of information identifying, for example, one or more of the antennas which constitute the first directional transceiver at which the positioning packet arrived or by which the positioning packet was emitted.

Next, in step S2, the controller 10 uses the first directional transceiver 14A to determine a direction of a vector $V_2$ from the first directional transceiver 14A to the third directional transceiver 14C. This may be carried out in similar way to that described with reference to step S1. Once again, at this stage, the information identifying the direction is relative only to the first directional transceiver 14A.

Subsequently, in steps S3 and S4, the controller 10 uses the second directional transceiver 14B to determine a direction of third and fourth vectors $V_3$, $V_4$ from the second directional transceiver 14B to the first and third directional transceivers 14A, 14C respectively. Steps S3 and S4 may be performed similarly to steps S1 and S2.

Next, in step S5, the controller 10 determines a first angle $\alpha_1$ between the determined directions of the first and second vectors $V_1$, $V_2$. Subsequently, in step S6, the controller 10 determines a second angle $\alpha_2$ between the directions of the third and fourth vectors $V_3$, $V_4$.

Subsequently, in step S7, the controller 10 uses the first and second angles $\alpha_1$, $\alpha_2$ to calculate a location 30C of the third directional transceiver 14C. The determined location 30C of the third directional transceiver 14C is in a local coordinate system that is defined relative to the first, second and third directional transceivers 14A, a4B, 14C. When calculating the location of the third directional transceiver 14C, the controller 10 may define the local coordinate system such that the first directional transceiver 14A is located at its origin (i.e. such that the location 30A of the first directional transceiver 14A has coordinates (0, 0, 0) in the local coordinate system). In addition, the controller 10 may define the location 30B of the second directional transceiver 14B as sharing two coordinates with the location 30A of the first directional transceiver 14A. As such, the location 30B of the second directional transceiver 14B may be defined as, for example, (d, 0, 0) where d is the distance between the locations 30A, 30B of the first and second directional transceivers 14A, 14B. The controller 10 may also define that the location 30C of the third directional transceiver 14C shares one coordinate with the locations 30A, 30B of the first and second directional transceivers 14A, 14B. For example, the location 30C of the third directional transceiver 14C in the local coordinate system may be defined as ($x_{DT3}$, $y_{DT3}$, 0), where $x_{DT3}$ and $y_{DT3}$ are unknown coordinates which are calculated in step S7.

The location 30C of the third directional transceiver 14C may be determined using triangulation. As such, if the locations 30A, 30B, 30C of the first, second and third directional transceivers 14A, 14B, 14C are (0, 0, 0), (d, 0, 0) and ($x_{DT3}$, $y_{DT3}$, 0), the two unknown coordinates may be calculated as follows:

$$x_{DT3} = \frac{d\cos\alpha_1 \sin\alpha_2}{\sin(\alpha_1 + \alpha_2)} \qquad \text{Equation 1}$$

$$y_{DT3} = \frac{d\sin\alpha_1 \sin\alpha_2}{\sin(\alpha_1 + \alpha_2)} \qquad \text{Equation 2}$$

Subsequently, in step S8, the controller 10 uses the locations of the first, second and third directional transceivers 14A, 14B, 14C in the local coordinate system to determine the orientations in the local coordinate system of the first and second directional transceivers 14A, 14B. This may be performed by first determining the directions in the local coordinate system of the first to fourth vectors $V_1$-$V_4$. Subsequently, the controller 10 may use the determined directions in conjunction with knowledge of the configuration of the array of antennas of each directional transceiver 14, 14B to identify the orientations of the directional transceivers 14A, 14B.

In some examples, the determination of the orientation, in the local coordinate system, of the first directional transceiver 14A may be carried out determining the rotation of the local coordinate system that is required such that the directions, in the local coordinate system, of the first and second vectors V1, V2 match the directions determined in steps S1 and S2. The directions determined in steps S1 and S2 are in a coordinate system that is defined by the calibration/geometry of the first directional transceiver 14A only. This coordinate system rotation may be determined analytically. Alternatively, this may be determined iteratively, for example by looping through all possible rotations at, for example 2 degree intervals. The rotation at which the difference between the directions is the smallest gives us the orientation of the directional transceiver 14A. The controller 10 may be operable also to perform additional iterations using smaller intervals centred on the rotation which yielded the smallest difference between directions. In this way, the accuracy may be improved. The orientation of the second directional transceiver 14B may be determined in a similar way.

Having calculated the location 30C of the third directional transceiver 14C and the orientations of the first and second directional transceivers 14A, 14B, the controller 10 is able to determine if any of the first to third directional transceivers 14A, 14B, 14C has been rotated and/or translated from an initial location/orientation. This may be performed, in step S8A, by comparing the parameters identifying the location of the third directional transceiver 14C and the orientations of the first and second directional transceivers 14B, 14C with corresponding reference parameters stored in the table 12B. If there are discrepancies between the calculated and reference parameters, the controller 10 can determine that the locations and/or orientations of the one or more directional transceivers have been altered.

In some examples, in which it is desired only to detect if the directional transceivers in a positioning system have been moved, the method may be terminated subsequent to step S8A. In other examples, subsequent to step S8A, the method proceeds to step S9. In yet other examples, the method proceeds directly from step S8 to step S9, without step S8A being performed.

In step S9, the controller 10 uses the third directional transceiver 14C to determine the direction of a fifth vector $V_5$ from the third directional transceiver 14C to the first directional transceiver 14A. This direction may be relative to the third directional transceiver 14C only and may be performed similarly to step S1.

Subsequently, in step S10, the controller 10 uses the third directional transceiver 14C to determine the direction of a sixth vector $V_6$ from the third directional transceiver 14C to the second directional transceiver 14B.

Optionally, in step S10A, the controller 10 determines a third angle $\alpha_3$ between the directions of the fifth and sixth vectors $V_5$, $V_6$ respectively. Subsequently, in step S10B, the controller 10 determines if the sum of the first, second and third angles are within an acceptable error range of $\pi$ radians (i.e. if $\alpha_1 + \alpha_2 + \alpha_3 = \pi$ (=180 degrees)). Following a positive determination, the controller 10 proceeds to step S11. In the event of a negative determination, the controller 10 terminates the method. This is because, if the angles of the triangle do not sum to 180 degrees, it is clear that an error has occurred when determining the directions of the first to sixth vectors $V_1$-$V_6$. The controller 10 may subsequently restart the method and may use a different combination of the plural directional transceivers as the first, second and third directional transceivers 14A, 14B, 14C.

Subsequent to step S10 or, in examples in which steps S10A and S10B are performed, subsequent to a positive determination in step S10B, the controller 10 proceeds to step S11. In step S11, the orientation of the third directional transceiver 14C is determined. This may be carried out using the directions of the fifth and sixth vectors $V_5$, $V_6$ in the local coordinate in conjunction with knowledge of the configuration of the array of antennas of which the third directional transceiver 14C is comprised.

After performing step S11, the controller 10 knows the locations and orientations relative to the local coordinate system of each of the first to third directional transceivers 14A, 14B, 14C. These parameters may have been stored in the table 12B by the controller 10 as they were calculated.

Figure 4B:
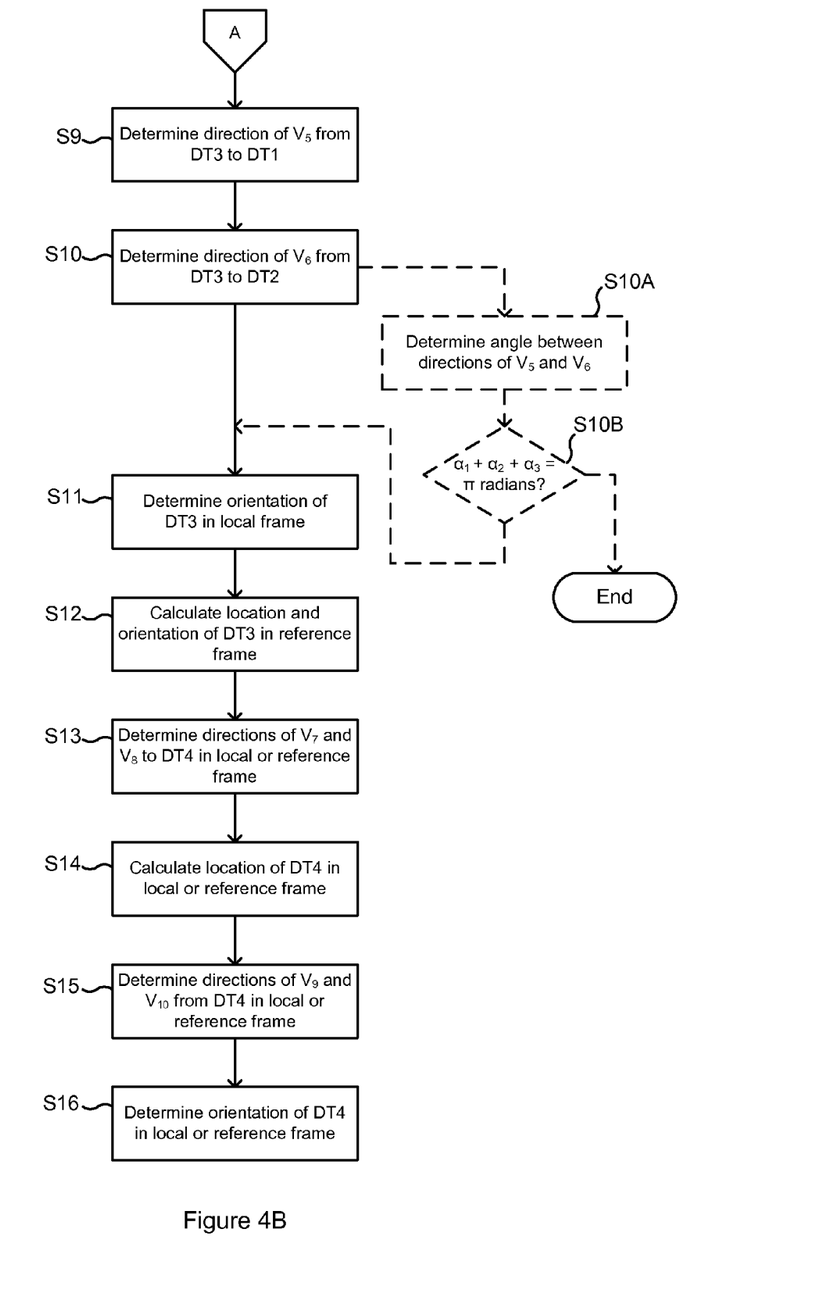

Subsequently, in step S12, the controller 10 calculates the location and orientation in the reference coordinate system of at least the third directional transceiver 14C. In order to calculate these parameters, the controller 10 requires knowledge of at least some parameters (i.e. location and/or orientation), in the reference coordinate system, relating to the first and second directional transceivers 14A, 14B. In some examples, the pre-known parameters may include at least: the location in the reference coordinate system of one of the first and second directional transceivers 14A, 14B; the distance in the reference coordinate system between the first and second transceivers 1A, 14B; and the orientation relative to the reference coordinate system of the one of the first and second directional transceivers 14A, 14B for which the location is known. In other examples, the pre-known parameters may include the locations in the reference coordinate system of the first to third directional transceivers 14A, 14B, 14C. This provides sufficient information to allow the orientations of the third directional transceiver 14C in the reference coordinate system to be calculated.

It will of course be appreciated that other combinations of pre-known parameters may also enable the at least one of the orientation and location of the third directional transceiver 14C in the reference coordinate system to be calculated.

The pre-known parameters may have been measured by hand or in any other suitable way and may have been stored in the table 12B prior to starting the method of FIGS. 4A and 4B. It will of course be appreciated that any unknown locations and/or orientations in the reference coordinate system of the first and second directional transceivers 14A, 14B may also be calculated in step S12.

It will thus be understood that methods according to example embodiments allow the location and orientation relative to a reference coordinate system of at least one directional transceiver 14 in an in-field positioning system to be calculated post-installation. As such, there is no need to position the directional transceiver 14 accurately during installation or subsequently to measure accurately its location and orientation by hand.

In some example embodiments, the method proceeds to step S13. In step S13, the controller 10 uses two of the directional transceivers for which the orientations and locations in at least the local coordinate system are known to determine directions of seventh and eighth vectors $V_7$, $V_8$ to the fourth directional transceiver 14D. In this example, the seventh vector $V_7$ is from the first directional transceiver 14A to the fourth directional transceiver 14D and the eighth vector $V_8$ is from the third directional transceiver 14C to the fourth directional transceiver 14D.

Next, in step S14, the controller 10 calculates the location 30D of the fourth directional transceiver 14D in the local coordinate system (or, in examples in which step S12 was performed, in the reference coordinate system). This may be performed by calculating the point of intersection between the seventh and eighth vectors $V_7$, $V_8$.

Next, in step S15, the controller 10 determines the directions of ninth and tenth vectors $V_9$, $V_{10}$ from the fourth directional transceiver 14D to first and third directional transceivers 14A, 14C respectively. Subsequently, in step S16, the controller 10 uses the directions of the ninth and tenth vectors $V_9$, $V_{10}$ in conjunction with knowledge of the configuration of the antenna array of which the fourth directional transceiver 14D is comprised to determine the orientation of the fourth directional transceiver 14D.

In some examples, the location and orientation of the fourth directional antenna 14D may be determined using plural different pairs of directional transceivers 14 for which the location and orientations are known. As such, in the example of FIG. 3, the first and second directional transceivers 14A, 14B and/or the second and third directional transceivers 14B, 14C may also be used to determine the location 30D and orientation of the fourth directional transceiver 14D. This improves the accuracy of the calculation of the parameters of the fourth directional transceiver 14D as it allows the parameters determined using each pair of transceivers to be averaged and, if applicable, clearly erroneous parameters to be disregarded.

In some example embodiments in which the system comprises more than four directional transceivers 14, steps S13 to S16 may be repeated for other directional transceivers (not shown).

It will be appreciated that the benefit derived by methods according to example embodiments is greater when the number of directional transceivers in the system is higher. This is because the same amount of pre-known information is required to allow the calculation of the orientations and locations in the reference coordinate system of all directional transceivers 14 in the system, regardless of the number of directional transceivers 14 in the system.

The choice of which directional transceivers of a positioning system to use as the first, second and third directional transceivers 14A, 14B, 14C when carrying out methods according to example embodiments may be performed in any suitable way. For example, the choice may be made automatically based on received signal strength indication (RSSI) measurements between the directional transceivers 14. The three transceivers which yield the highest RSSIs when communicating with one another may be selected by the controller 10 as the first, second and third transceivers 14A, 14B, 14C. The selection may also or alternatively be made based on the number of parameters relative to the global coordinate system which is known in respect of each transceiver. It may be beneficial to use the directional transceiver for which the most parameters are known as the first directional transceiver 14A. Alternatively, the three transceivers which are estimated to be most-suitably orientated in respect of one another, may be used. It will of course be appreciated that all of the above factors may be taken into account by either the controller 10 or the user when selecting the first, second and third directional transceivers 14A, 14B, 14C.

According to some example embodiments, the method of FIG. 4 may be repeated one or more times using different combinations of directional transceivers of the positioning system as the first, second and third transceivers 14A, 14B, 14C. In this way the locations and orientations of the directional transceivers as returned by different iterations of the method may be averaged and/or erroneous parameters may be disregarded. As such, the accuracy of the measured parameters may be improved.

In example embodiments for use with positioning systems having relatively few directional transceivers, aspects of the method of FIGS. 4A and 4B may be performed using one or more temporary, uninstalled directional transceivers in conjunction with the installed transceivers which form part of the positioning system. The orientation and location of these temporary transceivers may be measured immediately prior to carrying out the method. This may therefore reduce or negate the need for parameters of the installed directional transceivers to be known.

Temporary, uninstalled transceivers which do not form part of the positioning system may also be useful for carrying out methods according to example embodiments in positioning systems in which one or more of the installed directional transceivers is unable to communicate with at least two other installed directional transceivers 14 in the system. Two directional transceivers are able to communicate with one another when a direct line between the directional transceivers is incident on each of the transceivers at an angle which falls within its cone (outside which it may be unable to send packets or to receive positioning packets from which the direction of incidence can be accurately determined). In some in-field positioning systems, such as those in which only two-dimensional location measurements are required, the angle of the cone may be 60 degrees either side of the axis of symmetry of the cone. In such systems, in which all the directional transceivers may, for example, be installed on the same surface with the same orientation, the use of additional, temporary directional transceivers may be particularly beneficial. These temporary directional transceivers may have a wider angle of view and/or may be more accurate than the transceivers which form part of the positioning system.

In positioning systems in which three-dimensional positions are required to be returned, the directional transceivers may all be oriented differently and so may all be able to "see" one another. One example of this is where a positioning system comprises a directional transceiver located at each corner of a cubic volume. In such systems, no additional directional transceivers may be required to allow methods according to example to be performed. However, additional transceivers may be used nonetheless to improve the accuracy of the calibration of the system.

It will of course be appreciated that the steps of the method of FIGS. 4A and 4B may be performed in different orders, or that some steps may be omitted. For example, steps S1 and S3 may be performed concurrently. In other words, the controller 10 may determine the direction of the vector $V_1$ by determining the direction of departure of at least one positioning packet from the first directional transceiver 14A and may determine the direction of the vector $V_2$ by determining the direction of arrival at the second directional transceiver 14B of the same at least one positioning packet. This is also true for steps S2 and S4.

In some examples, steps S9, S10, S10A and S10B may be performed between steps S6 and S7. In this way, if the three angles $\alpha_1, \alpha_2, \alpha_3$, do not equal 180 degrees, the method may be restarted without having calculated the location and orientation of the third directional transceiver 14C. Also, in some examples, step S12 may be performed subsequent to step S16. As such, the conversion of calculated parameters from the local coordinate system to the reference coordinate system may be performed for the third, fourth and any additional directional transceivers simultaneously.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
receiving, in a processing module, signals received from a first directional transceiver to determine a first angle between a first vector from the first directional transceiver to a second directional transceiver and a second vector from the first directional transceiver to a third directional transceiver, wherein the processing module causes the second and third directional transceivers to transmit positioning packets to the first directional transceiver, respectively defining the first vector and second vector;

receiving, in the processing module, signals received from the second directional transceiver to determine a second angle between a third vector from the second directional transceiver to the first directional transceiver and a fourth vector from the second directional transceiver to the third directional transceiver, wherein the processing module causes the first and third directional transceivers to transmit positioning packets to the second directional transceiver, respectively defining the third vector and fourth vector;

calculating, in the processing module, a location, relative to a local coordinate system, of the third directional transceiver using the first and second angles and locations in the local coordinate system of the first and second directional transceivers, the local coordinate system being defined relative to the locations of the first, second and third directional transceivers;

calculating, in the processing module, an orientation relative to the local coordinate system of the first directional transceiver using directions of the first and second vectors relative to the first directional transceiver and the locations in the local coordinate system of the first, second and third directional transceivers; and calculating, in the processing module, an orientation relative to the local coordinate system of the second directional transceiver using directions of the third and fourth vectors relative to the second directional transceiver and the locations in the local coordinate system of the first, second and third directional transceivers.

2. The method of claim 1 comprising calculating at least one of:
the location of the third directional transceiver relative to a reference coordinate system;
the orientation of the first directional transceiver relative to the reference coordinate system; and
the orientation of the second directional transceiver relative to the reference coordinate system, using:
the calculated orientations of the first and second directional transceivers;
the calculated location of the third directional transceiver; and
pre-stored information identifying parameters, in the reference coordinate system, relating to the first and second directional transceivers.

3. The method of claim 1, comprising using the third directional transceiver to determine a third angle between a fifth vector from the third directional transceiver to the first directional transceiver and a sixth vector from the third directional transceiver to the second directional transceiver.

4. The method of claim 3, comprising calculating an orientation relative to the local coordinate system of the third directional transceiver using directions of the fifth and sixth vectors relative to the third directional transceiver and the locations relative to the local coordinate system of the first, second and third directional transceivers.

5. The method of claim 3, comprising:
using one of the first, second and third directional transceivers to determine a direction of a seventh vector from the one of the first, second and third transceivers to a fourth directional transceiver;
using another one of the first, second and third directional transceivers to determine a direction of an eighth vector from the another one of the first, second and third directional transceivers to the fourth directional transceiver; and calculating a location of the fourth directional transceiver using the locations of the one and the another one of the first, second and third directional transceivers and the directions of the seventh and eighth vectors.

6. The method of claim 5, comprising:
using the fourth transceiver to determine a direction of a ninth vector from the fourth directional transceiver to the one of the first, second and third directional transceivers;
using the fourth transceiver to determine a direction of a tenth vector from the fourth directional transceiver to the another one of the first, second and third directional transceivers; and
calculating an orientation of the fourth directional transceiver using the locations of the one and the another one of the first, second and third directional transceivers, the location of the fourth directional transceiver, and the directions of the ninth and tenth vectors.

7. The method of claim 3 comprising:
summing the first, second and third angles;
if the sum of the first, second and third angles is within equal to one hundred and eighty degrees, calculating the location of the third directional transceiver; and
if the sum of the first, second and third angles is outside not equal to one hundred and eighty degrees, discontinuing the method.

8. The method of claim 7 comprising, subsequent to discontinuing the method, restarting the method with another directional transceiver substituted in place of at least one of the first, second and third directional transceivers.

9. The method of claim 1 wherein at least one of the first, second and third directional transceivers forms part of a positioning system for determining a location of a device.

10. The method of claim 9 wherein the positioning system of directional transceivers can test for at least one of the following:
a) additions of one or more directional transceivers to the system,
b) removals of one or more directional transceivers from the system,
c) movements of one or more directional transceivers in location within the system or
d) movements in orientation within the system of a directional transceiver.

11. Apparatus comprising at least one processor and at least one memory including computer program code, the at least one memory and the computer program code configured to, with the at least one processor, cause the apparatus:
to receive, in a processing module, signals received from a first directional transceiver to determine a first angle between a first vector from the first directional transceiver to a second directional transceiver and a second vector from the first directional transceiver to a third directional transceiver, wherein the processing module causes the second and third directional transceivers to transmit positioning packets to the first directional transceiver, respectively defining the first vector and second vector;
to receive, in the processing module, signals received from the second directional transceiver to determine a second angle between a third vector from the second directional transceiver to the first directional transceiver and a fourth vector from the second directional transceiver to the third directional transceiver, wherein the processing module causes the first and third directional transceivers to transmit positioning packets to the second directional transceiver, respectively defining the third vector and fourth vector;
to calculate, in the processing module, a location, relative to a local coordinate system, of the third directional transceiver using the first and second angles and locations in the local coordinate system of the first and second directional transceivers, the local coordinate system being defined relative to the locations of the first, second and third transceivers;
to calculate, in the processing module, an orientation relative to the local coordinate system of the first directional transceiver using directions of the first and second vectors relative to the first directional transceiver and the locations in the local coordinate system of the first, second and third directional transceivers; and
to calculate, in the processing module, an orientation relative to the local coordinate system of the second directional transceiver using directions of the third and fourth vectors relative to the second directional transceiver and the locations in the local coordinate system of the first, second and third directional transceivers.

12. The apparatus of claim 11, wherein the at least one memory and the computer program code are configured, with the at least one processor, to cause the apparatus to calculate at least one of:
the location of the third directional transceiver relative to a reference coordinate system;
the orientation of the first directional transceiver relative to the reference coordinate system; and
the orientation of the second directional transceiver relative to the reference coordinate system, using:
the calculated orientations of the first and second directional transceivers;
the calculated location of the third directional transceiver; and
pre-stored information identifying parameters, in the reference coordinate system, relating to the first and second directional transceivers.

13. The apparatus of claim 11, wherein the at least one memory and the computer program code are configured, with the at least one processor, to cause the apparatus:
to use the third directional transceiver to determine a third angle between a fifth vector from the third directional transceiver to the first directional transceiver and a sixth vector from the third directional transceiver to the second directional transceiver.

14. The apparatus of claim 13, wherein the at least one memory and the computer program code are configured, with the at least one processor, to cause the apparatus:
to calculate an orientation relative to the local coordinate system of the third directional transceiver using directions of the fifth and sixth vectors relative to the third directional transceiver and the locations relative to the local coordinate system of the first, second and third directional transceivers.

15. The apparatus of claim 13, wherein the at least one memory and the computer program code are configured, with the at least one processor, to cause the apparatus:
to use one of the first, second and third directional transceivers to determine a direction of a seventh vector from the one of the first, second and third directional transceivers to a fourth directional transceiver;
to use another one of the first, second and third directional transceivers to determine a direction of an eighth vector from the another one of the first, second and third directional transceivers to the fourth directional transceiver; and to calculate a location of the fourth directional transceiver using the locations of the one and the another one of the first, second and third directional transceivers and the directions of the seventh and eighth vectors.

16. The apparatus of claim 15, wherein the at least one memory and the computer program code are configured, with the at least one processor, to cause the apparatus:

to use the fourth transceiver to determine a direction of a ninth vector from the fourth directional transceiver to the one of the first, second and third directional transceivers;

to use the fourth transceiver to determine a direction of a tenth vector from the fourth directional transceiver to the another one of the first, second and third directional transceivers; and to calculate an orientation of the fourth directional transceiver using the locations of the one and the another one of the first, second and third directional transceivers, the location of the fourth directional transceiver, and the directions of the ninth and tenth vectors.

17. The apparatus of claim 13, wherein the at least one memory and the computer program code are configured, with the at least one processor, to cause the apparatus:

to sum the first, second and third angles;

if the sum of the first, second and third angles is equal to one hundred and eighty degrees, to calculate the location of the third directional transceiver; and if the sum of the first, second and third angles is not equal to one hundred and eighty degrees, to discontinue operations.

18. The apparatus of claim 17, wherein the at least one memory and the computer program code are configured, with the at least one processor, to cause the apparatus:

subsequent to discontinuing operations, to restart operations with another directional transceiver substituted in place of at least one of the first, second and third directional transceivers.

19. The apparatus of claim 11, wherein at least one of the first, second and third directional transceivers forms part of a positioning system for determining a location of a device.

20. The apparatus of claim 19, wherein the positioning system, having a cluster of directional transceivers having control circuitry or at least on memory and one processor, on the one hand, on the other hand, belong to a measurement engine and wherein the control circuitry is configured to or at least one memory and the computer program code are configured to, with at least one processor, cause the apparatus to report the results of the following:

a) additions of one or more directional transceivers to the system, b) removals of one or more directional transceivers from the system, c) movements of one or more directional transceivers within the system or d) movements in orientation of a directional transceiver within the system.

21. A non-transitory computer readable storage medium in which computer program code is stored, the computer program code causing an apparatus to perform a method according to claim 1.

* * * * *